PRIOR ART

METHOD AND APPARATUS FOR AUTOMATICALLY CONNECTING TAPES

United States Patent Office
3,783,064
Patented Jan. 1, 1974

3,783,064

METHOD AND APPARATUS FOR AUTOMATICALLY CONNECTING TAPES

Kei Okubo, Neyagawa, Katuyuki Yamamoto, Osaka, and Osamu Murayama, Kadoma, Japan, assignors to Matsushita Electric Industrial Co., Ltd., Osaka, Japan Filed Dec. 7, 1971, Ser. No. 205,551
Claims priority, application Japan, Dec. 9, 1970, 45/109,824, 45/109,825; Dec. 25, 1970, 45/130,071
Int. Cl. G03d *15/04*
U.S. Cl. 156—159 3 Claims

ABSTRACT OF THE DISCLOSURE

In supplying an adhesive tape from one after another of a plurality of tape reels, a method of and an apparatus for automatically connecting the trailing end of the tape of a preceding tape reel with the leading end of the tape of a successive tape reel in a positive manner with no slackness, and particularly a continuous tape supplying apparatus comprising a stack of tape magazines each having the leading end portion of the tape drawn out from the tape reel, and a turntable for successively individually positioning said tape magazines in a tape supplying position.

BACKGROUND OF THE INVENTION

Field of the invention

This invention relates to a method of and an apparatus for automatically connecting the trailing end of the adhesive tape of one tape reel with the leading end of the adhesive tape of another tape reel with no slackness, thereby to continuously successively supply the adhesive tapes from a plurality of tape reels as a continuous tape.

Description of the prior art

In supplying a tape successively from one after another of a plurality of tape reels, there has generally been employed a method which will be described with reference to FIG. 1. Namely, a table T with product $S_1$, $S_2$, . . . mounted thereon is rotated in the direction of the arrow and a tape delivered from a tape reel, set in a position E, is labelled sequentially to the products $S_1$, $S_2$, . . . . When the tape of the tape reel has been exhausted, the tape is automatically delivered from a tape reel in a position F and labelled sequentially to the products $S_2$, $S_3$, . . . , and during this period, a new tape reel is manually set in the position E. The above described operation is repeated while supplying new tape reels alternately in the positions E and F. Therefore, such prior art method is not adapted for use in the event when the tape must be supplied constantly continuously. Furthermore, in the prior art method a new tape reel must be manually supplied in each position at each time when the tape has been used up. These disadvantages of the prior art method have been eliminated by the present invention.

SUMMARY OF THE INVENTION

The object of the present invention is to provide a method of and an apparatus by which the ends of the tapes of a plurality of tape reels, previously mounted on magazines respectively, are automatically quickly connected with each other with no slackness, whereby the tapes can be supplied constantly automatically as a continuous tape without requiring labor and, therefore, the utility of labor force can be enhanced.

DESCRIPTION OF THE PREFERRED EMBODIMENT

Figure 1:
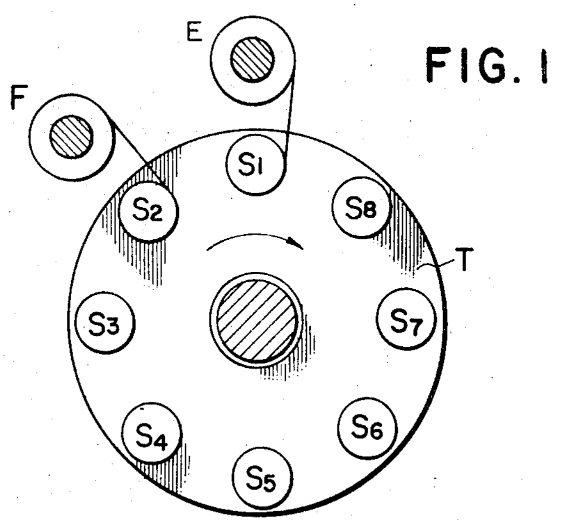
FIG. 1 is a schematic plan view of an apparatus used in practicing the conventional automatic tape connecting method.

The present invention will be described in detail with reference to an embodiment thereof shown in the drawings, and first of all, the tape connecting mechanism, which is the essential portion of the apparatus used for practicing the automatic tape connecting method of the invention, will be described with reference to FIGS. 3, 4, 5 and 6.

A magazine 2 located in a tape supplying position C is provided with a tape reel 3 having a tape 1 wound thereon. The tape 1 is supplied from the tape reel 3 while being guided by three rollers 4, 5 and 5' fixedly mounted on a bracket (to be described later) indicated by the phantom line, and a tape cutter 6 is provided between the rollers 4 and 5. Each of the three rollers 4, 5 and 5' has upper and lower flanges to define the vertical position of the tape 1 to be guided thereby.

Figure 9:
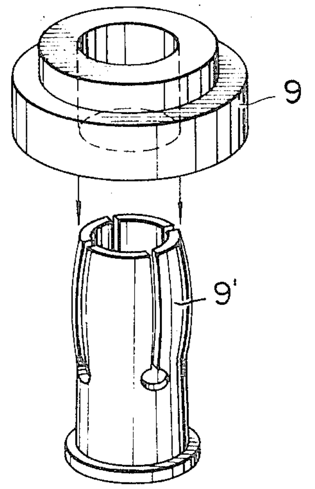
FIG. 9 is a perspective view showing the tape end holding roller provided on the magazine and a pin on which said roller is mounted.
Figure 10:
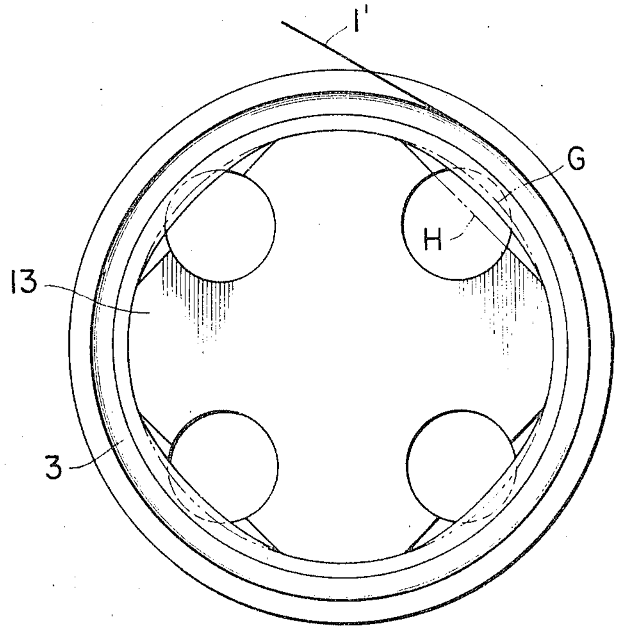
FIG. 10 is a top plan view of the tape reel.

Before the magazine 2 is set in a stocker (to be described later), the leading end of the tape is extended along a roller 7, fixed mounted on said magazine and tentatively secured to a hollow stepped roller 9 having a smaller diameter upper portion and a larger diameter lower portion of a width equal to the width of the tape, as shown in a position B. The stepped roller 9 is mounted on a pin 9' which is located close to a main shaft 8 of the turntable (to be described later) and fixedly mounted on a pivot arm 11 pivotable about a pin 10 fixed on the magazine 2. The pin 9' consists of a hollow cylindrical body made of an elastic material and having a plurality of vertical slits formed therein from the top edge thereof as shown in FIG. 9. Therefore, when the stepped roller 9 is mounted on the pin 9', the upper portion of said pin 9' is elastically deformed by the inner surface of the stepped roller 9 and provides a suitable braking force to said stepped roller when the latter rotates. It will also be understood that the stepped roller 9 can be easily mounted on and demounted from the pin 9'. Reference numeral 12 designates a tension spring urging the pivot arm 11 to rotate in a clockwise direction, and 12' designates a stopper holding said pivot arm 11 against the clockwise rotation.

The tape reel 3 is mounted on a reel holder 13 and a brake 14 is provided for engagement with the tape to maintain taut the tape being delivered from said tape reel. The tape holder 13 is formed with finger receiving notches at four locations. The inner core of the tape reel 3 is made of a deformable material, such as a thick paper and hence the inner diameter of said core varies from one another. Therefore, if the portions G of the reel holder 13 are round as shown in FIG. 1, the tape reel cannot be mounted on said reel holder when the inner diameter of the core is relatively small or the core cannot be held in frictional engagement with the reel holder and hence the tape cannot be maintained taut when the inner diameter of the core is relatively large. For this reason, the edge portions of the reel holder 13 are cut away to the lines H at said four locations and the portions G of the peripheral edge of the same are slightly bulged radially outwardly. By so doing, the tape reel 3 when mounted on the reel holder is deflected, and when the tape is drawn out, is rotated in a counterclockwise direction together with the reel holder 13 under the tension of the tape.

Figure 5:
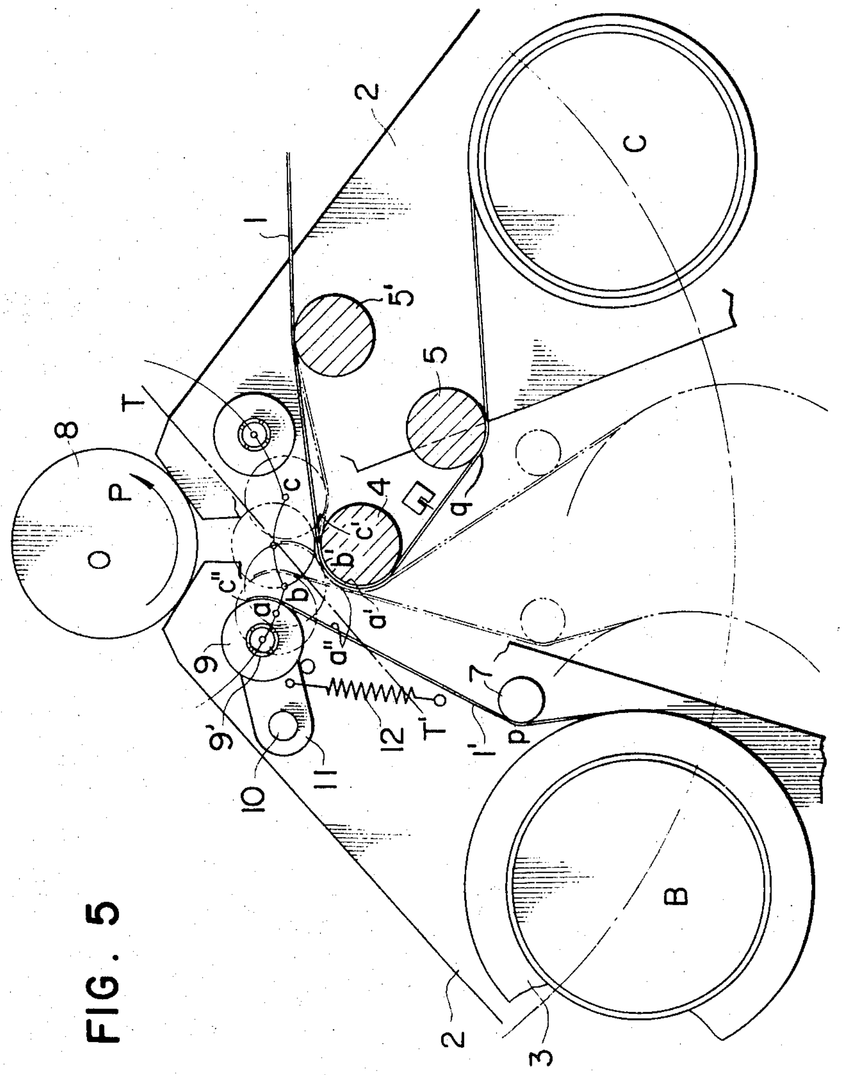
FIG. 5 is a fragmentary plan view for explaining a particularly important portion of the tape connecting mechanism.

After mounting the tape reel 3 on the reel holder 13 in the manner described, the leading end of the tape 1' is drawn out from said tape reel and tentatively secured to the peripheral surface of the stepped roller 9 in a length slightly longer than the length *a'–c'* shown in FIG. 5. The stepped roller 9 having the tape end thus secured thereto is mounted on the pin 9'.

Then, the reel holder 23 is rotated in a clockwise direction by the fingers inserted into the finger receiving notches formed therein, to rewind the tape such that the arcuate length *a''–c''* of the tape in contact with the stepped roller 9 becomes largest but smaller than the length *a'–c'*. After setting the tape reel in the manner described, the magazine 2 is placed in the stocker (to be described later).

Figure 2:
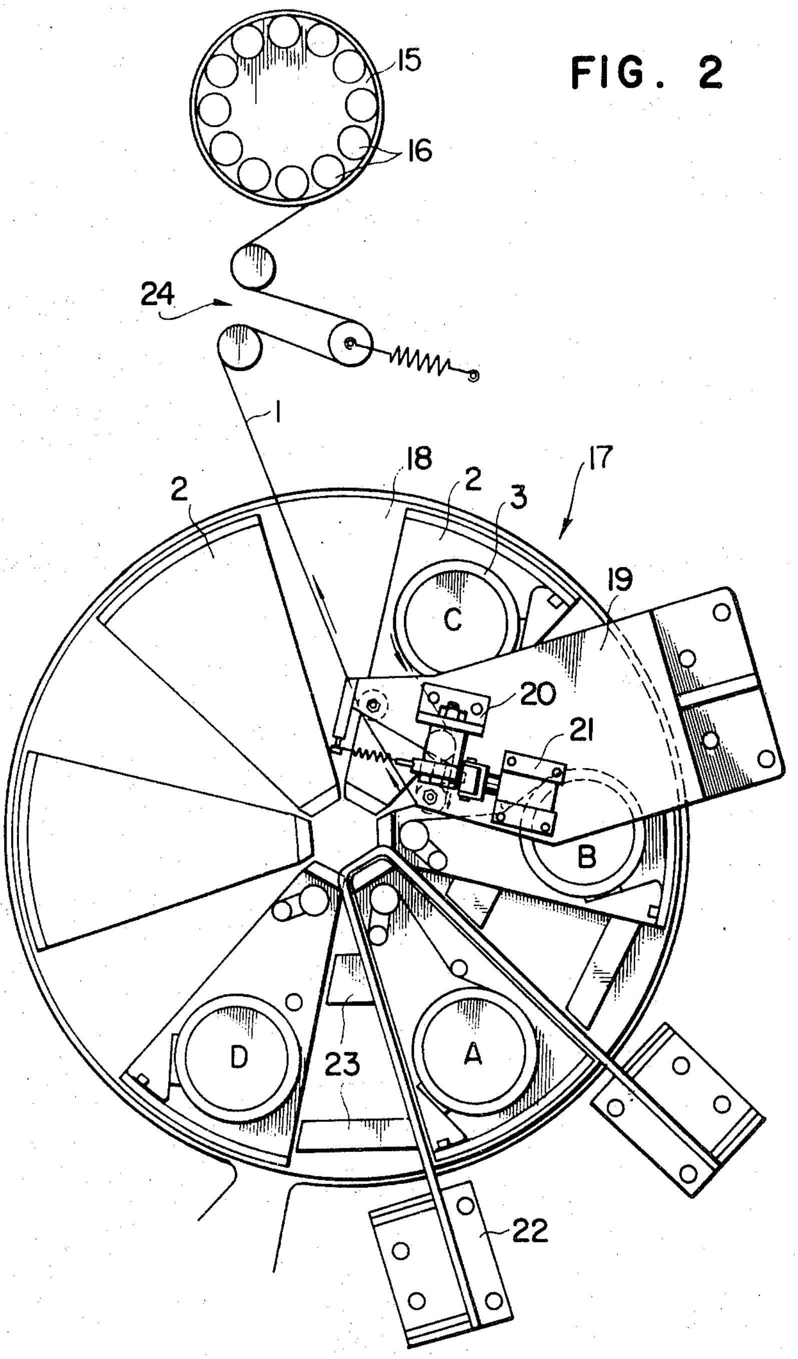
FIG. 2 is an overall plan view of an embodiment of the apparatus for practicing the automatic tape connecting method according to the present invention.
Figure 3:
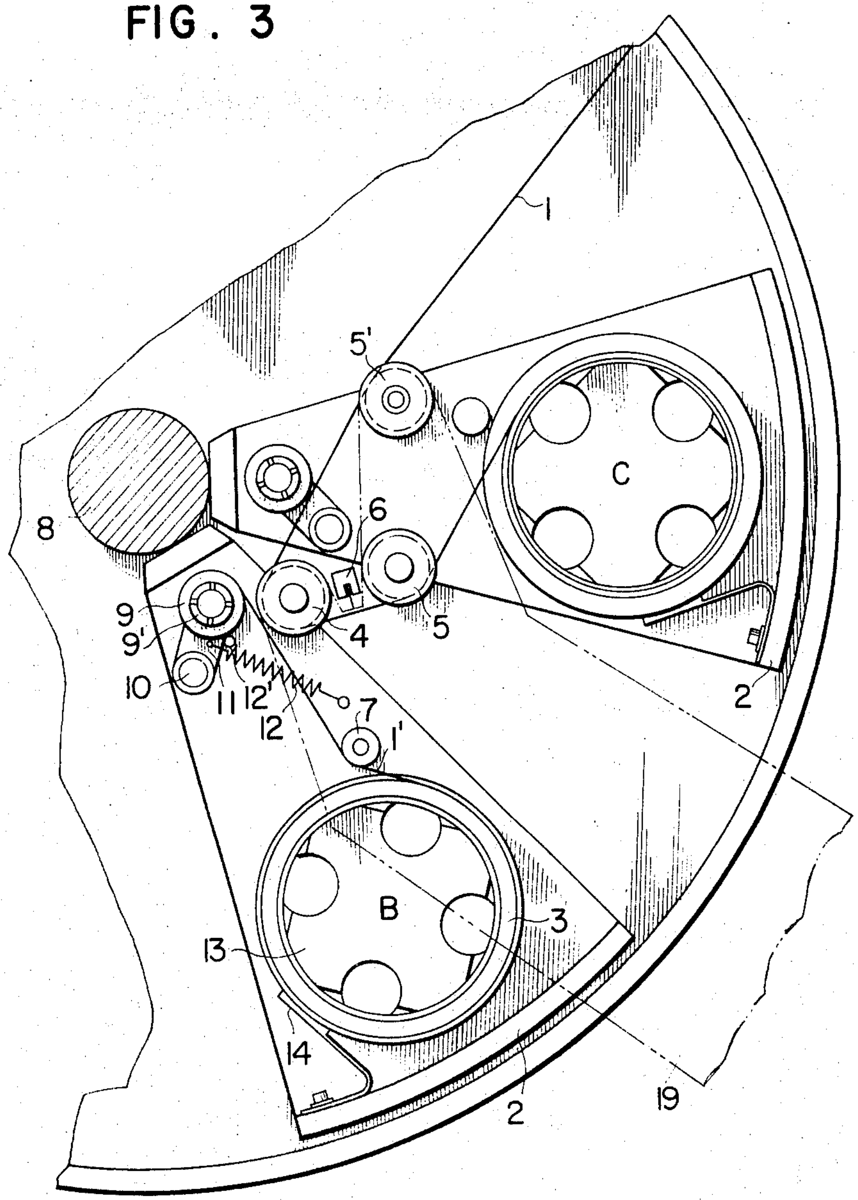
FIG. 3 is a fragmentary plan view showing the tape connecting mechanism which is the essential portion of the apparatus shown in FIG. 2.
Figure 4:
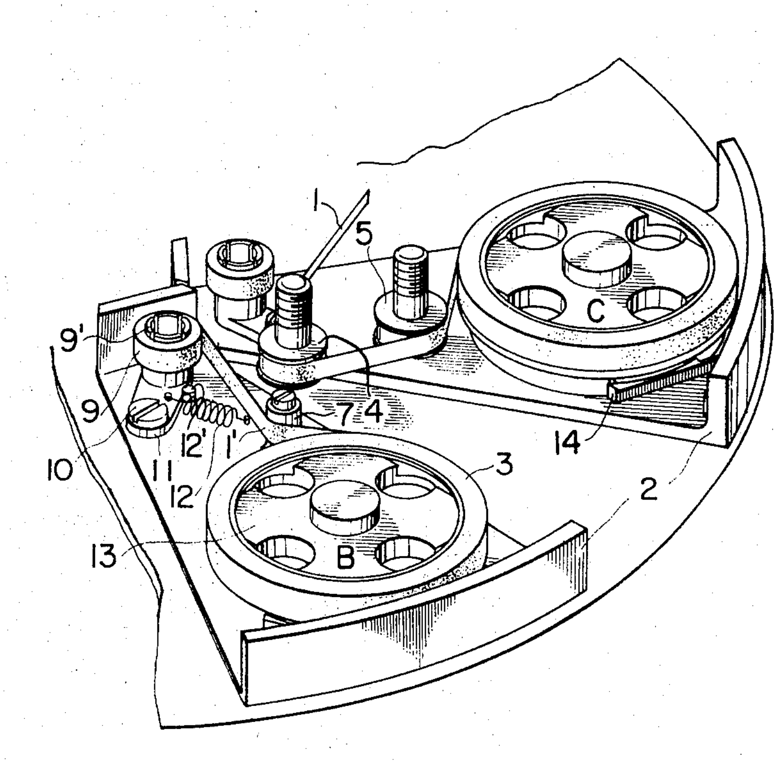
FIG. 4 is a fragmentary perspective view of the mechanism shown in FIG. 3.

Now, the overall arrangement of an embodiment of the apparatus for practicing the present invention will be described with reference to FIG. 2. FIG. 2 illustrates a process of labelling the continuously supplied tape 1 to products 16 arranged peripherally of a turntable 15 shown at the upper portion of the figure. The tape 1 is supplied from the apparatus 17 of the invention comprising the tape connecting mechanism described above. When the tape of one tape reel 1 has been used up, the turntable 18 of the apparatus is automatically rotated one pitch in the direction of A, B, C, D and the tape 1' of the new tape reel 3 on the next magazine 2 is connected to the trailing end of the preceding tape 1' and at the same time next tape reel is located in the tape supplying position.

The tape connecting mechanism is mounted on a bracket 19 which also has a bracket 20 supporting the tape cutter 6 and a solenoid 21 for actuating said tape cutter mounted thereon. The bracket 19 is secured to the outside of the turntable 18 and overlies said turntable between the magazine positions B and C.

In a position A, a plurality of the magazines 2 each having a new tape 1' set therein in the manner described are stacked within the stocker 22. These magazines are successively shifted from the position A to the positions B, C, . . . in the order mentioned and the empty magazines are removed from the turntable 18 at a position D. Reference numeral 23 designates a shutter by which the lowermost one of the stack magazines 2 is pushed from the position A to the position B, and 24 designates a tape tension mechanism interposed between the turntables 18 and 15, and comprising three rollers.

The method of the invention is operated as described hereunder with reference to FIG. 5.

Each magazine has the tape reel set therein in the manner described above, with the leading end of the tape extended from said tape reel around the roller 7 and lapped around the stepped roller 9 over an angle of $\theta$. Therefore, when the magazine is shifted from the position B to the position C incident to the rotation of the turntable 18 in the direction of the arrow P, the point *a''* of the tape 1' is brought into contact with the point *a'* of the tape 1 engaging around the roller 4 on the bracket 19 with the adhesive surface facing outwardly, as shown in FIG. 5. Then, the length *a''–c''* of the tape 1' is brought into contact with the length *a'–c'* of the tape 1, and the length *a''–p* of the tape 1' is brought into the length *a'–q* of the tape 1 from the point *a''* side, whereby both tapes are bonded together.

Namely, when the roller 9 has reached a position *a*, the tapes 1 and 1' are in line contact with each other at the point *a'* or *a''* and immediately thereafter, the tape 1' bends at the point *a''* toward the rotating direction of the turnable or in the direction of the arrow P, to be fastly bonded to the tape 1 in an increasing length, while causing the roller 9 to make a pivotal movement in a clockwise direction against the braking force applied thereto by the elastic pivot pin 9'.

After having reached a position *b*, the center of the roller 9 moves while drawing an arc concentric with the center of the roller 4 as shown, and the roller 9 is caused continuously to make its pivotal movement in the clockwise direction by the tape 1'. Thus, the length *a''–c''* of the tape 1' is completely bonded to the tape 1 by the time when the roller 9 reaches a point *c* incident to the movement of the magazine.

When the roller 9 has reached the point *c*, the spring 12 loses its biasing force and the pressure of the roller 9' is removed from the tape 1'. Therefore, it will be understood that the tape 1' must be set in the magazine such that the condition *a''–c''*<A'–*c'* be satisfied.

The position of the roller 7 relative to the magazine is also important. Because, in order to prevent the length *a''–c''* of the tape 1' from slackening when it is bonded to the trailing end of the tape 1, it is necessary for the roller 9 to roll on the surface of the roller 4 after the point *a''* of the tape 1'' is brought into contact with the point a' of the tape 1. To this end, the contact point between the tape 1' and the roller 7 must be on the front side of the bisector of the centers of the rollers 9 and 4 with respect to the rotating direction of the turntable.

On the other hand, the roller 7 moves along an arc concentric with the center O of the turntable to cause the length *a''–p* of the tape 1' to make a pivotal movement about the point *a''* toward the roller 5.

Therefore, in order to draw the tape 1' from the tape reel while maintaining it taut and bond it to the tape 1 with no slackness, the position of the roller 7 must be such that the locus of the point *p* of the tape 1' constantly gets close to the center O of the turntable with respect to the locus of the roller 7.

In connecting the tapes 1 and 1' with each other, the tape 1 must be cut after said tapes 1 and 1' have been bonded together with a sufficient bonding strength but before the length *a''–p* of the tape 1' gets too close to the tape 1.

Figure 7:
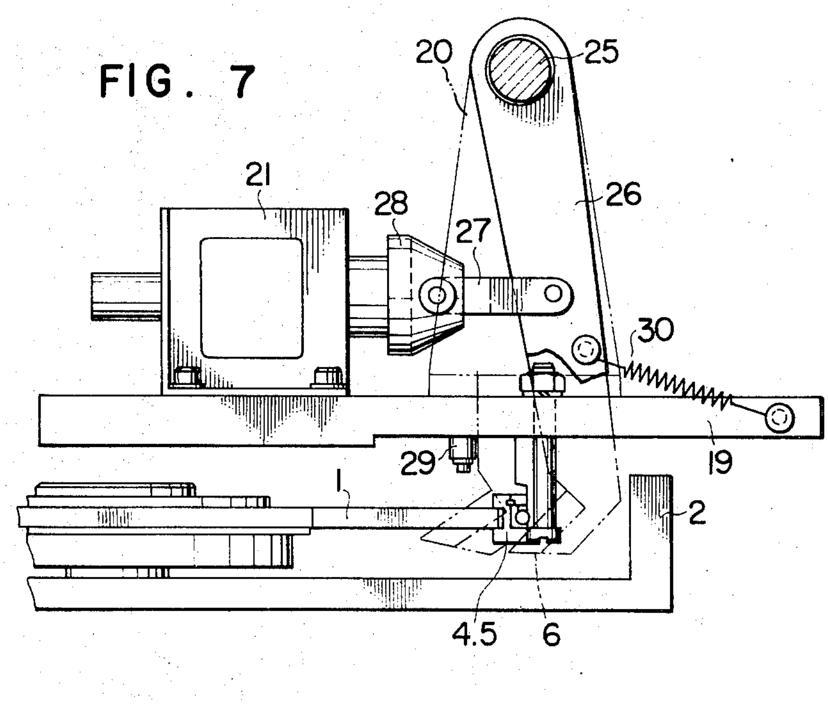
FIG. 7 is a vertical elevational view showing the construction of the tape cutter portion of the tape connecting mechanism.

The cutting of the tape 1 is effected by the tape cutter 6, which will be described hereunder with reference to FIG. 7.

Figure 8:
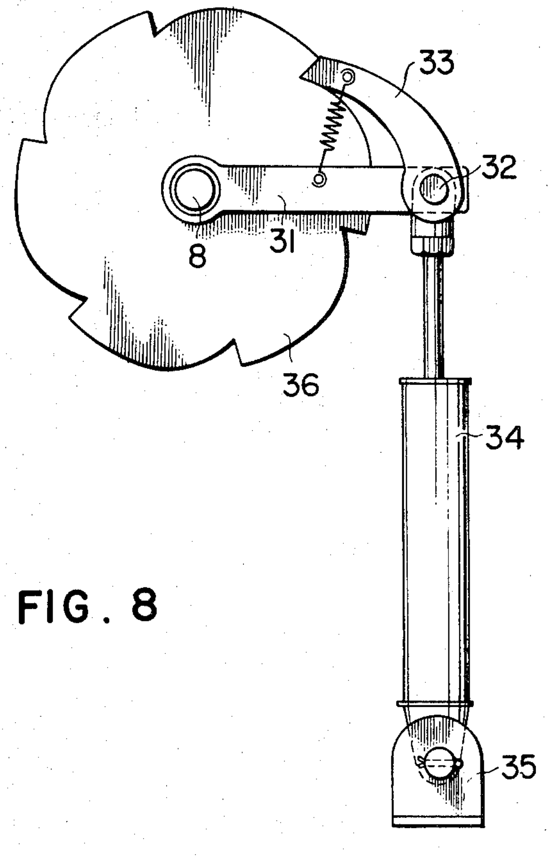
FIG. 8 is a plan view showing the outline of a turntable driving mechanism of the apparatus.

The tape cutter 6 is connected to one end of a lever 26, the other end of which is pivotally mounted on a shaft 25 fixedly supported by the bracket 20. The central portion of the lever 26 is connected through a link 27 to one end of a plunger 28 of the solenoid 21. Reference numeral 29 is a stopper provided on the bracket 19 to limit the pivotal movement of the lever 26, and 30 designates a spring to return the lever 26 to its original position upon de-energization of the solenoid. When the tapes 1 and 1' has been connected, the solenoid 21 is excited in response to a signal representative of the completion of tape connection and the cutter 6 is operated by said solenoid to cut the tape 1 instantaneously by its oblique cutting edge. A mechanism for rotating the turntable will be briefly described hereunder with reference to FIG. 8.

A lever 31 is rotatably mounted at one end on the main shaft 8 of the turntable 18. At the other end of the lever 31 is provided a pin 32, on which one end of a ratchet 33 and one end of a piston rod of a cylinder 34 are rotatably mounted. The cylinder 34 is pivotally mounted at the other end on a pin provided on a bracket 35 for pivotal movement thereabout.

The piston rod of the cylinder 34 is normally held in a retracted position but is projected when a predetermined length of the tape 1 of the tape reel 3 has been used up, to cause the ratchet 33 to rotate a ratchet wheel 36 one pitch, which is integrally provided on the underside of the turntable 18. The turntable 18 and the ratchet wheel 36 are fixedly mounted on the main shaft 8 and, therefore, said turntable is rotated one pitch on each intermittent rotation of said ratchet wheel.

Figure 6:
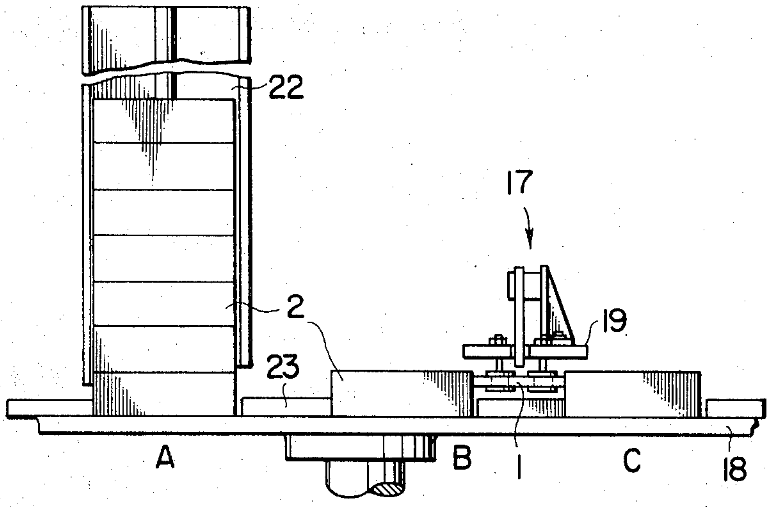
FIG. 6 is a vertical elevational view of a portion of the apparatus shown in FIG. 2 for explaining the apparatus of the invention.

The continuous tape supplying apparatus constructed as described above operates as follows:

First of all, the overall operation of the apparatus will be described with reference to FIGS. 2 and 6. A plurality of the magazines 2 each having a new tape reel 3 set therein are previously stacked in the stocker 22 at the position A as shown in FIG. 6. The lowermost magazine 2 is pushed by the shutter 23 and shifted to the position B.

In the position C, the tape 1 is paid out from the magazine 2, led along the path indicated by the arrows in FIG. 2 and labelled successively to the products 16 arranged peripherally of the turntable 15. In this case, the tape 1 is maintained suitably taut by the tape tension mechanism 24 comprising the three rollers.

With $Lo$ representing the entire length of the tape 1' before use, $l$ the length of the tape supplied or used on rotation of the turntable 15 one pitch, and $n$ the number of the products which are labelled by one tape reel 3, $Lo > ln$ and it is desirable that the value of $n$ is greater.

After determining the value of $n$, the number of intermittent rotation of the turntable 15 is counted and, when the counted number has reached the predetermined value of $n$, the turntable 18 is rotationally advanced one pitch in the direction of A, B, C, . . . by the above-described driving mechanism.

In this case, the leading end of the tape 1' of the magazine in the position B is connected with the adhesive side of the tape 1' by the tape connecting mechanism provided in front of the position B, and the trailing end portion of the tape 1 is cut by the above-described tape cutter, whereby the tapes 1' and 1 are connected into a continuous tape. The magazine 2 in the position B is shifted to the position C and the tape 1' is drawn out of said magazine to be labelled to the products on the turntable 15. The used magazine is shifted successively from the position C to the forward positions by being carried on the turntable 18, with the remaining length of tape therein and, when reached the position D, removed from the turntable mechanically to the outside. The tape connecting mechanism operates as follows: Each magazine has a new tape reel mounted therein, with the leading end of the tape previously extended around the roller 7 and lapped around the stepped roller 9 over a certain angle to be tentatively secured thereto, as stated previously, and with the adhesive surface facing outwardly. When the magazine is shifted from the position B to the position C, the point $a''$ of the tape 1' is brought into contact with the point $a'$ of the tape 1 on the roller 4 fixedly mounted on the bracket 19 and successively thereafter, the length $a''$–$c''$ of the tape 1' is adhesively bonded to the length $a'$–$c'$ of the tape 1 and the length $a''$–$p$ of the former is adhesively bonded to the length $a'$–$q$ of the latter in the manner shown in FIG. 5. Thus, the tapes 1' and 1 are adhesively connected with each other. In this case, it is to be noted that the peripheral surface of the roller 9 must have adhesiveness enough to produce between it and the length $b'$–$c'$ of the tape an adhesive strength which is smaller than the adhesive strength between the tapes 1' and 1 over the length of a $a'$–$b'$ but larger than the braking force of the pin 9'.

As described above, it is possible by employing the automatic tape connecting method and apparatus of the invention to automatically connect the tapes with each other with no slackness in supplying the tape successively from one after another of a plurality of tape reels, and automatically continuously supply the tapes of the respective tape reels as one continuous tape. The present invention is applicable to all and any tape handling apparatus and of great industrial advantage.

We claim:

1. A method of automatically connecting tapes with each other, comprising mounting a tape reel on a rotatable reel holder provided in a tape magazine with the leading end of the tape extending from said tape reel and tentatively secured to a pivotable roller also provided in said tape magazine, stacking a plurality of such tape magazines in a stocker with the lowermost one resting on a turntable, intermittently rotating said turntable a predetermined pitch just before the tape of the preceding tape magazine is used up at a tape supplying position where the tape is paid out from the tape magazine and supplied to the place of use along a curved path defined by fixed rollers in such a manner that the adhesive surface of said tape faces outwardly of said curved path, whereby said tape magazines in said stocker are successively shifted to said tape supplying position from the lowermost one and the non-adhesive surface of the leading end of the tape in the successive tape magazine is adhesively bonded to the outwardly facing adhesive surface of the trailing end portion of the tape in the preceding tape magazine by the action of said roller provided in said successive tape magazine, and cutting the trailing end portion of the tape in said preceding tape magazine at a point behind the bonded portion.

2. An apparatus for automatically connecting tapes with each other, comprising a plurality of tape magazines each having provided therein a rotatable reel holder for mounting a tape reel thereon and a pivotable roller for tentatively securing the leading end of the tape of said tape reel thereto, a stocker for stacking said plurality of tape magazines therein, a turntable underlying said stocker with the lowermost one of said tape magazines resting thereon, means for intermittently driving said turntable a predetermined pitch to successively individually shifting said tape magazines to a tape supplying position where the tape is paid out from the tape magazine and supplied to the place of use along a curved path defined by fixed rollers in such a manner that the adhesive surface of said tape faces outwardly of said curved path, timing means for actuating said driving means just before the tape of the preceding tape magazine at said tape supplying position is used up, whereby the lowermost one of said tape magazines in said stocker is shifted to said tape supplying position and the non-adhesive surface of the leading end of the tape in said lowermost tape magazine is adhesively bonded to the outwardly facing adhesive surface of the trailing end portion of the tape in the preceding tape magazine by the action of said pivotable roller in the successive tape magazine, and cutting means for cutting the trailing end portion of the tape in said preceding tape magazine at a point behind the bonded portion.

3. An apparatus for automatically connecting tapes with each other, as defined in claim 2, wherein said pivotable roller is a cylindrical stepped roller having a smaller diameter upper portion and a larger diameter lower portion which is rendered suitably adhesive to the tape and has a width substantially equal to the width of the tape, and is rotatably mounted on a hollow cylindrical pin provided at one end of a pivot arm the other end of which is mounted on a pivot pin fixed in the tape magazine, said hollow cylindrical pin being made of an elastic material and having a plurality of slits formed in the upper portion thereof so that it is elastically deformed when said pivotable roller is mounted thereon to apply a braking force thereto, and said reel holder is a member having a base to maintain the tape reel at the same level as the pivotable roller and a disc portion having a diameter slightly larger than the inner diameter of said tape reel so as to prevent slippage between it and said tape reel and having the peripheral edge portion thereof cut away at a plurality of locations, and further there is provided brake means for applying a braking force to said reel holder.

References Cited

UNITED STATES PATENTS

| | | | |
|---|---|---|---|
| 3,537,663 | 11/1970 | Johnson ---------- | 156—504 X |
| 3,634,170 | 1/1972 | Hottendorf -------- | 156—502 X |

WILLIAM A. POWELL, Primary Examiner

U.S. Cl. X.R.

156—508, 509, 546